(12) United States Patent
Ma et al.

(10) Patent No.: US 11,745,747 B2
(45) Date of Patent: Sep. 5, 2023

(54) SYSTEM AND METHOD OF ADAPTIVE DISTRIBUTION OF AUTONOMOUS DRIVING COMPUTATIONS

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/822,389

(22) Filed: Aug. 25, 2022

(65) Prior Publication Data

US 2023/0066189 A1     Mar. 2, 2023

Related U.S. Application Data

(60) Provisional application No. 63/366,738, filed on Jun. 21, 2022, provisional application No. 63/237,035, (Continued)

(51) Int. Cl.
*B60W 50/06*     (2006.01)
*G05D 1/00*     (2006.01)
(Continued)

(52) U.S. Cl.
CPC ..... *B60W 50/0205* (2013.01); *B60W 50/0097* (2013.01); *B60W 50/023* (2013.01);
(Continued)

(58) Field of Classification Search
CPC ............. B60W 50/06; B60W 60/0027; B60W 2556/45
See application file for complete search history.

(56) References Cited

U.S. PATENT DOCUMENTS

2005/0065711 A1*    3/2005   Dahlgren ......... G08G 1/096775
                                                                                                        701/117
2008/0059015 A1*    3/2008   Whittaker .............. G08G 1/161
                                                                                                            901/1
(Continued)

OTHER PUBLICATIONS

PCT International Search Report and Written Opinion issued in corresponding application No. PCT/US2022/041598, dated Jan. 9, 2023.

*Primary Examiner* — Tan Q Nguyen
(74) *Attorney, Agent, or Firm* — Maschoff Brennan

(57) ABSTRACT

A method may include obtaining sensor data relating to an autonomous vehicle (AV) and a total measurable world around the AV. The method may include identifying an operating environment of the AV and determining a projected computational load for computing subsystems that facilitate a driving operation performable by the AV corresponding to the identified environment. The method may include off-loading first computing subsystems of the computing subsystems in which computations of the first computing subsystems may be processed by an off-board cloud computing system and processing computations associated with second computing subsystems of the computing subsystems by an on-board computing system. The method may include obtaining first computational results corresponding to the computations processed relating to the first computing subsystems and determining the driving operation of the AV based on the first computational results and second computational results corresponding to computations processed relating to the second computing subsystems.

17 Claims, 6 Drawing Sheets

Related U.S. Application Data filed on Aug. 25, 2021, provisional application No. 63/237,038, filed on Aug. 25, 2021, provisional application No. 63/237,036, filed on Aug. 25, 2021.

(51) Int. Cl.
| | | |
|---|---|---|
| *B60W 50/02* | (2012.01) | |
| *B60W 50/04* | (2006.01) | |
| *B60W 60/00* | (2020.01) | |
| *B60W 50/00* | (2006.01) | |
| *B60W 50/023* | (2012.01) | |

(52) U.S. Cl.
CPC .......... *B60W 50/045* (2013.01); *B60W 50/06* (2013.01); *B60W 60/0027* (2020.02); *G05D 1/0088* (2013.01); *B60W 2050/046* (2013.01); *B60W 2556/45* (2020.02); *G05D 2201/0213* (2013.01)

(56) References Cited

U.S. PATENT DOCUMENTS

| | | | |
|---|---|---|---|
| 2015/0346724 A1* | 12/2015 | Jones | B62D 15/025 |
| | | | 701/23 |
| 2018/0040240 A1 | 2/2018 | Newman | |
| 2019/0152490 A1 | 5/2019 | Lan et al. | |
| 2019/0258251 A1 | 8/2019 | Ditty et al. | |
| 2022/0136853 A1* | 5/2022 | Ferencz | G06V 10/454 |
| | | | 701/423 |
| 2022/0139128 A1* | 5/2022 | Motegi | B60W 40/09 |
| | | | 701/1 |

* cited by examiner

SYSTEM AND METHOD OF ADAPTIVE DISTRIBUTION OF AUTONOMOUS DRIVING COMPUTATIONS

CROSS-REFERENCE TO RELATED APPLICATIONS

This application claims the benefit of U.S. Patent Application Ser. No. 63/237,035, filed on Aug. 25, 2021, U.S. Patent Application Ser. No. 63/237,036, filed on Aug. 25, 2021, U.S. Patent Application Ser. No. 63/237,038, filed on Aug. 25, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of adaptive distribution of autonomous driving computations.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining sensor data relating to an autonomous vehicle (AV) and a total measurable world around the AV. The method may include identifying an environment in which the AV is operating based on the obtained sensor data and determining a projected computational load for computing subsystems of the AV corresponding to the identified environment in which the computing subsystems may be configured to facilitate a driving operation performable by the AV. The method may include off-loading one or more first computing subsystems of the computing subsystems in which computations of the one or more first computing subsystems are to be processed by an off-board cloud computing system and processing computations associated with one or more second computing subsystems of the computing subsystems by an on-board computing system. The method may include obtaining first computational results corresponding to the computations processed in relation to the first computing subsystems and determining the driving operation to be performed by the AV based on the first computational results and second computational results corresponding to computations processed in relation to the second computing subsystems.

In some embodiments, determining the projected computational load for the computing subsystems of the AV may include identifying one or more objects proximate to the AV based on the obtained sensor data, predicting whether the environment in which the AV is operating is likely to experience an unexpected situation that relates to the driving operation of the AV, and estimating the projected computational load for the AV based on the one or more objects and a likelihood of the AV experiencing the unexpected situation.

In some embodiments, the first computing subsystems may include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

In some embodiments, the second computing subsystems may include at least one of: one or more sensor groups, a drive-by-wire abstraction system, a real vehicle drive-by-wire system, one or more basic safety redundant sensors, and a virtual bumper system.

In some embodiments, off-loading the first computing subsystems of the computing subsystems to be processed by the off-board cloud computing system may be based on an estimated computational resource usage associated with the identified environment. A number of the first computing subsystems off-loaded to be processed by the off-board cloud computing system may increase as the estimated computational resource usage of the identified environment increases.

In some embodiments, the method may further include determining an updated projected computational load for computing subsystems of the AV. Based on the updated projected computational load, an additional computing subsystem may be offloaded to be processed by the off-board cloud computing system or computations associated with at least one of the first computing subsystems may be reclaimed to be performed by the on-board computing system.

One or more embodiments of the present disclosure may include one or more non-transitory computer-readable storage media configured to store instructions that, in response to being executed, cause a system to perform operations. The operations may include obtaining sensor data relating to an autonomous vehicle (AV) and a total measurable world around the AV. The operations may include identifying an environment in which the AV is operating based on the obtained sensor data and determining a projected computational load for computing subsystems of the AV corresponding to the identified environment in which the computing subsystems may be configured to facilitate a driving operation performable by the AV. The operations may include off-loading one or more first computing subsystems of the computing subsystems in which computations of the one or more first computing subsystems are to be processed by an off-board cloud computing system and processing computations associated with one or more second computing subsystems of the computing subsystems by an on-board computing system. The operations may include obtaining first computational results corresponding to the computations processed in relation to the first computing subsystems and determining the driving operation to be performed by the AV based on the first computational results and second computational results corresponding to computations processed in relation to the second computing subsystems.

In some embodiments, determining the projected computational load for the computing subsystems of the AV may include identifying one or more objects proximate to the AV based on the obtained sensor data, predicting whether the environment in which the AV is operating is likely to experience an unexpected situation that relates to the driving operation of the AV, and estimating the projected computational load for the AV based on the one or more objects and a likelihood of the AV experiencing the unexpected situation.

In some embodiments, the first computing subsystems may include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

In some embodiments, the second computing subsystems may include at least one of: one or more sensor groups, a drive-by-wire abstraction system, a real vehicle drive-by-wire system, one or more basic safety redundant sensors, and a virtual bumper system.

In some embodiments, off-loading the first computing subsystems of the computing subsystems to be processed by the off-board cloud computing system may be based on an estimated computational resource usage associated with the identified environment. A number of the first computing subsystems off-loaded to be processed by the off-board cloud computing system may increase as the estimated computational resource usage of the identified environment increases.

In some embodiments, the operations may further include determining an updated projected computational load for computing subsystems of the AV. Based on the updated projected computational load, an additional computing subsystem may be offloaded to be processed by the off-board cloud computing system or computations associated with at least one of the first computing subsystems may be reclaimed to be performed by the on-board computing system.

One or more embodiments of the present disclosure may include a system that includes a first computing system located remotely relative to an autonomous vehicle (AV), the first computing system including one or more computing subsystems configured to analyze sensor data collected by one or more sensor groups of a second computing system, wherein the first computing system is communicatively coupled to the second computing system and is configured to store instructions that, in response to being executed, cause the system to perform one or more operations. The system may include a second computing system on board the AV, the second computing system including the one or more sensor groups, a drive-by-wire abstraction system, and a real vehicle drive-by-wire system. The second computing system may be configured to store the instructions that, in response to being executed, cause the system to perform one or more of the operations. The operations may include obtaining sensor data relating to the AV and a total measurable world around the AV. The operations may include identifying an environment in which the AV is operating based on the obtained sensor data and determining a projected computational load for computing subsystems of the AV corresponding to the identified environment, the computing subsystems being configured to facilitate a driving operation performable by the AV. The operations may include off-loading one or more first computing subsystems of the computing subsystems in which computations of the one or more first computing subsystems are to be processed by the first computing system. The operations may include processing computations associated with one or more second computing subsystems of the computing subsystems by the second computing system and obtaining first computational results corresponding to computations processed in relation to the first computing subsystems. The operations may include determining the driving operation to be performed by the AV based on the first computational results and second computational results corresponding to computations processed in relation to the second computing subsystems.

In some embodiments, determining the projected computational load for the computing subsystems of the AV may include identifying one or more objects proximate to the AV based on the obtained sensor data, predicting whether the environment in which the AV is operating is likely to experience an unexpected situation that relates to the driving operation of the AV, and estimating the projected computational load for the AV based on the one or more objects and a likelihood of the AV experiencing the unexpected situation.

In some embodiments, the first computing subsystems may include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

In some embodiments, off-loading the first computing subsystems of the computing subsystems to be processed by the first computing system may be based on an estimated computational resource usage of the identified environment. A number of the first computing subsystems off-loaded to be processed by the first computing system may increase as the estimated computational resource usage of the identified environment increases.

In some embodiments, the system may further include a third computing system that includes one or more basic safety redundant sensors and a virtual bumper system.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
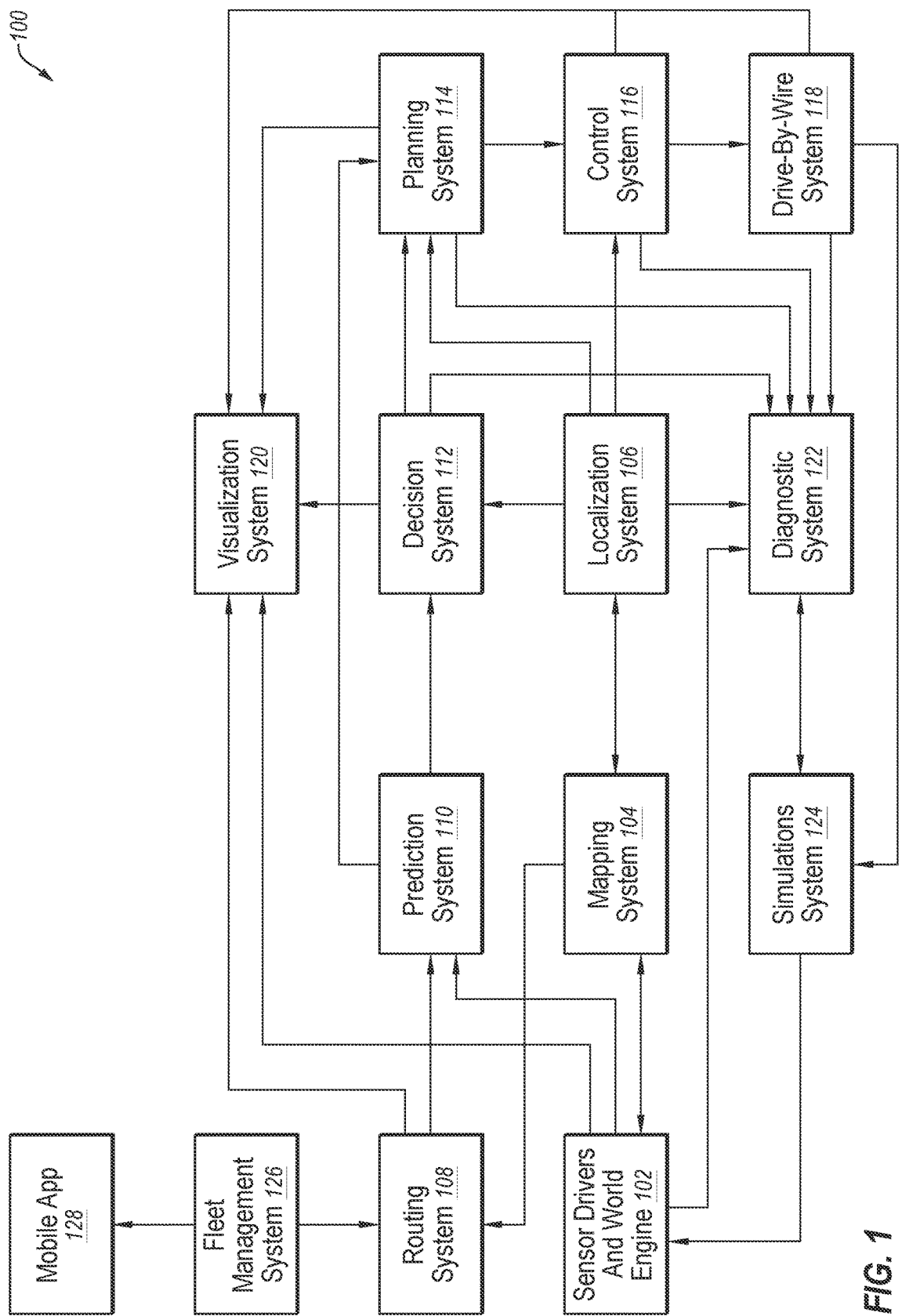
FIG. 1 illustrates an example embodiment of an autonomous driving system according to at least one embodiment of the present disclosure.

The present disclosure relates to an adaptive architecture that includes performing some operations of an autonomous vehicle (AV) by a computing system on board the AV ("on-board computing system") and other operations by an off-board cloud computing system. In some circumstances, the on-board computing system may include lower computing speed and/or less computing resources than the off-board cloud computing system. In these and other circumstances, however, the on-board computing system may perform computations at lower latencies than the off-board cloud computing system such that some computations of the on-board computing system are performed more quickly than the computations of the off-board cloud computing system. By allocating some operations of the AV to the on-board computing system and other operations to the off-board cloud computing system, the overall functionality and efficiency of the AV computing system may be improved.

AVs typically include seating space for human drivers and passengers comparable to traditional sedans and trunk storage space comparable to traditional sedans. Additionally or alternatively, AVs may include an electric motor, a battery for the electric motor, and charging components that facilitate providing motive power to the AV. Consequently, AVs may include limited space in which electrical components and/or computing components may be installed, or the AVs may be manufactured to be larger, which increases manufacturing costs, increases energy consumption, decreases driving range, or some combination thereof. Because the space available for electrical components and/or computing components is often limited for AVs, the processing power available to perform on-board computations associated with driving operations of the AVs may be similarly limited without increasing the size of the AVs.

More resource-intensive computations being performed by the AVs may also increase energy consumption, which may be supplied by an on-board battery system. Because the on-board battery systems may also be used to power the electric motors of the AVs, the driving ranges of the AVs may decrease as more resource-intensive computations are processed. Consequently, decreasing the computational processing load processed by on-board computing systems may increase the battery efficiency and driving range of the AVs.

Adaptive configuration of one or more computing subsystems and/or computing modules according to the present disclosure included in the on-board computing system and/or the off-board cloud computing system may facilitate performing more robust computations and/or improve synergy between the on-board computing system and the off-board cloud computing system. In some embodiments, adaptive attributes of the on-board computing subsystem that, for example, increase the frequency of data collection and/or analysis may affect a corresponding increase in the frequency of data collection and/or analysis by computing subsystems and/or modules included in the off-board cloud computing system.

Additionally or alternatively, the adaptive architecture may facilitate control of the AV in response to fleet-level data analysis because the off-board cloud computing system may obtain and/or process information from multiple AVs. In some embodiments, the off-board cloud computing system may utilize information from one or more first AVs to perform computations relating to a second AV. As such, the adaptive architecture may increase the information available for single-vehicle level computations and improve the accuracy and/or efficiency of the single-vehicle level computations.

Computations performed by an existing on-board computing system associated with a given AV may involve 30 computation elements, 40 computation elements, 50 computation elements, 60 computation elements, 70 computation elements, 80 computation elements, or any other number of computation elements in a given frame of operation that may be computed to facilitate operations of the given AV during the given frame. Computing systems are configured to process computation elements sequentially, and consequently, each of the computation elements in the given frame of operation may be computed sequentially by the existing on-board computing system of the given AV. As used herein, the term frame may refer to a segment of time, such as a frame of a video. The frame of operation may include sensor data, decisions, and many other computational tasks associated with the frame.

Configuration of an on-board computing system and an off-board cloud computing system using an adaptive architecture as described in the present disclosure may, among other things, facilitate parallel performance of the computation elements such that the given frame of operation may be executed more quickly and/or accurately than by existing on-board computing systems alone. For example, even for multi-core processors of the on-board computing system, a single task may be processed at a time (although different computations/processes to perform the task may be distributed between the multiple cores). The off-board cloud computing system may include one or more computing systems communicatively coupled with one another such that the computation elements are computed in parallel rather than sequentially because the computations off-loaded to the off-board cloud computing system may be simultaneously performed by the one or more computing systems.

Because different computation elements may involve different computation resource usages, prioritizing computation elements according to a scheduling policy may facilitate more efficient and faster processing of the computation elements. For example, a first given computation element may involve significantly greater computation resource usage than a second given computation element, but the first given computation element may be received by a computing system before the second given computation element. Rather than processing the first given computation element before the second given computation element, the second given computation element may be processed before the first given computation element assuming the two computation elements are equally important or approximately of equal importance.

Accordingly, the adaptive architecture according to the present disclosure may improve scheduling of such computation elements between the on-board computing system and the off-board cloud computing system. In some embodiments, the adaptive architecture may involve off-loading of more resource-intensive computation elements to the off-board cloud computing system, while less resource-intensive computation elements are designated for the on-board computing system to process.

Additionally or alternatively, managing the scheduling of computation elements according to the present disclosure may improve context switching between the computation elements. A decoding process and an encoding process may be performed by a computing system to process a given computation element, and because the decoding process and the encoding process may be involved in processing each computation element, sequencing the computation elements to decrease the amount of time spent on decoding and encoding of computation elements may lead to faster and more efficient processing of the computation elements. An AV computing system that includes an on-board computing system and an off-board cloud computing system as described in the present disclosure may provide more flexible computation element processing by sequentially grouping computation elements and designating the sequentially grouped computation elements for processing by either the on-board computing system or the off-board cloud computing system to decrease the amount of time and resources spent on decoding and encoding of the computation elements.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2:
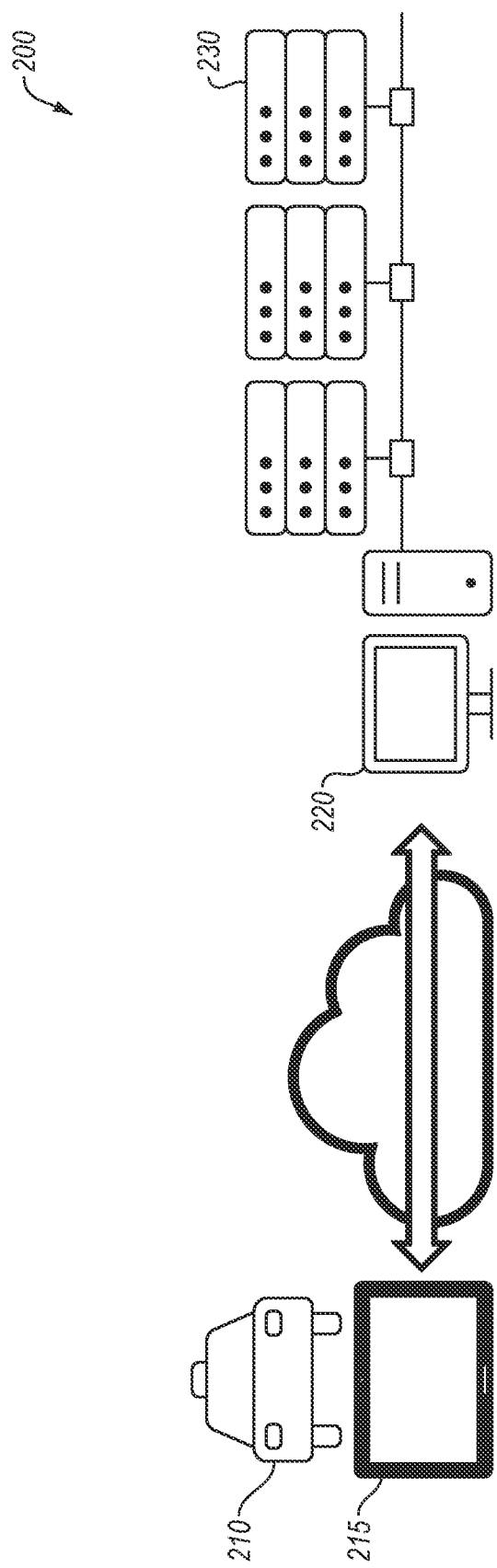
FIG. 2 illustrates an example computing system for autonomous driving according to one or more embodiments of the present disclosure.

FIG. 2 illustrates an example computing system for autonomous driving 200 according to one or more embodiments of the present disclosure. In some embodiments, the computing system for autonomous driving 200 may include a vehicle 210, such as the AV, which includes an on-board computing system 215 as described in further detail below in relation to FIG. 3. Additionally or alternatively, the on-board computing system 215 may be communicatively coupled with an off-board computing system, such as an off-board cloud computing system 220. In these and other embodiments, the off-board cloud computing system 220 may include one or more computing systems 230 such that the off-board cloud computing system 220 is capable of performing more robust and/or quicker computations than the on-board computing system 215 of the vehicle 210.

Modifications, additions, or omissions may be made to the computing system for autonomous driving 200 without departing from the scope of the present disclosure. For example, the designations of different elements in the manner described is meant to help explain concepts described herein and is not limiting. For instance, in some embodiments, the vehicle 210, the an on-board computing system 215, and/or the off-board cloud computing system 220 are delineated in the specific manner described to help with explaining concepts described herein but such delineation is not meant to be limiting. Further, the computing system for autonomous driving 200 may include any number of other elements or may be implemented within other systems or contexts than those described. For example, the computing system for autonomous driving 200 may be implemented within and/or in the context of the autonomous driving system 100 as described in relation to FIG. 1 and/or an AV computing system 300 as described in relation to FIG. 3.

Figure 3:
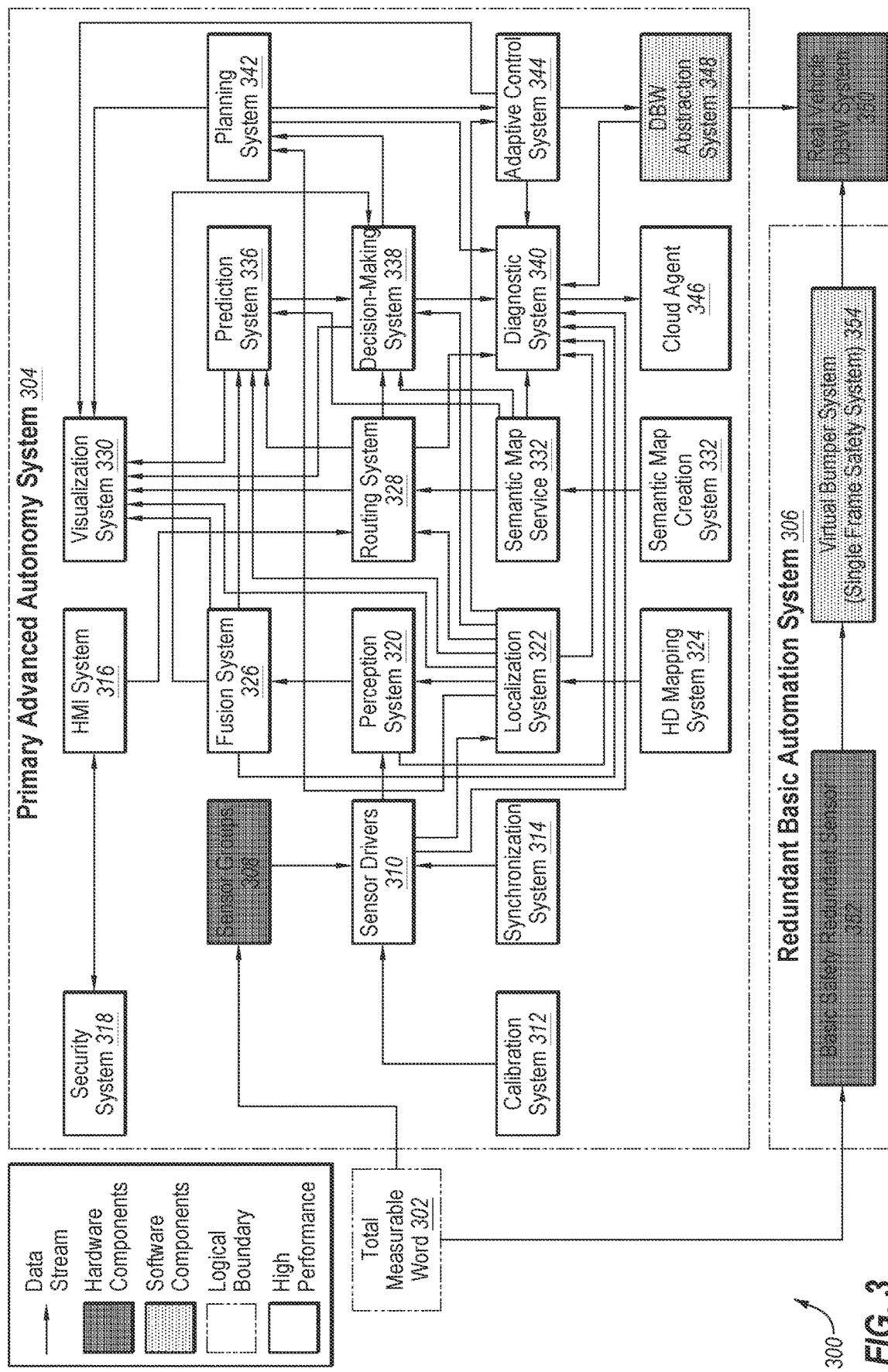
FIG. 3 illustrates an example adaptive architecture for high-performance cloud computation in autonomous driving according to the present disclosure.

FIG. 3 illustrates an example adaptive architecture for high-performance cloud computation in autonomous driving according to the present disclosure. In some embodiments, the AV computing system 300 may include a primary advanced autonomy subsystem 304 that includes one or more computing modules. One or more of the computing subsystems and/or the computing modules may be included with an on-board computing system, and one or more other computing subsystems and/or computing modules may be included in the off-board cloud computing system. In these and other embodiments, the instantiation of which location is performing, hosting, and/or otherwise operating the various subsystems and/or their respective modules may vary based on the circumstance, environment, settings, etc. between the on-board computing system and the one or more off-board cloud computing system. In some embodiments, certain operations of (or complete operation of) one or more subsystems may be changed from the on-board computing system to the one or more off-board cloud computing system, and/or vice versa.

In some embodiments, the location of the processing may be adaptive. For example, on a low-speed road that is not very busy, the AV may perform prediction and decision-making locally, while on a busier road at higher speeds, portions of a prediction system 338 and/or a decision-making system 340, for example, may be performed at the off-board cloud computing system. As another example, when operating on an open floor of a warehouse without other vehicles around, the AV may perform object detection and characterization locally, while in a busy parking lot, a perception system 322, a semantic map service 334, a semantic map creation system 336, any other computing subsystems, or some combination thereof may be performed or supplemented via the off-board cloud computing system. As a further example, the AV may perform localization of a location of the AV via the on-board computing system in situations in which the AV has recently obtained and/or calculated previous localization information (e.g., via previous localization computations or obtaining GPS data). However, a localization system 324 that is configured to perform the localization of the AV may be designated to be performed by the off-board cloud computing system in situations in which recent localization data is not available. In other words, the off-board cloud computing system may initialize the localization of the AV such that the on-board computing system may more readily perform localization computations from a starting point which was more computationally intensive and performed by the off-board cloud computing system. Whether to adaptively perform computations at the off-board cloud computing system may be determined according to the computational tasks being performed by the on-board computing system at a given point in time, the processing capacity of the on-board computing system.

In some embodiments, adaptive performance of computations may correspond to a projected computational load of a given environment in which the AV may be operating. Some environments, such as a rural road or an interstate highway road, may include few objects in the vicinity of the AV, and unexpected situations that affect the AV within such environments may be unlikely to arise. Consequently, the projected computational load associated with operating the AV in such environments may be correspondingly low. Other environments, such as a parking lot structure associated with a shopping mall or an active school zone, may include several objects in the vicinity of the AV, and unexpected situations may be likely to arise. For example, the parking lot structure associated with the shopping mall may include several vehicles positioned in parking spaces that may or may not move with little notice for the AV, vehicles driving in unpredictable directions between parking spaces, pedestrians suddenly appearing from between parked vehicles, shopping litter being blown across the street, some combination thereof, or any other factors that may affect the safety of the AV, a passenger of the AV, or other people in the vicinity of the AV. As an additional or alternative example, the active school zone may include several vehicles moving or stopping at unpredictable moments, children unexpectedly running across the street on which the AV is driving, pedestrians moving through crosswalks guided by human traffic personnel, some combination thereof, or any other factors. A human-operated vehicle in the active school zone and/or the mall parking lot structure may drive cautiously while observing the various objects around the human-operated vehicle. The operator of the human-operated vehicle may be prepared to make sudden maneuvers, such as braking or swerving, in response to any unexpected situations that arise in the vicinity of the human-operated vehicle. Accordingly, the computational load associated with the parking lot structure and/or the active school zone may be projected as likely to be high for the AV operating in such an environment. The computational load in these and other situations may involve processing the various objects in the vicinity of the AV at a high refresh rate so that the AV may be capable of accurately and quickly responding to any unexpected situations arising. Because of the great number of objects, the high computation frequency, or any other factors that may affect computational resources, the mall parking lot structure and the active school zone, among other environments, may be designated as high-projected computational load environments.

In some embodiments, the adaptability of the location of computations may be based on the rapidity with which results are expected for the AV computing system 300. For example, if rapid responses are expected, the AV computing system 300 may be configured to perform such associated computing tasks locally to avoid potential latency associated with communicating data for the computation for the off-board computing system and awaiting the communication back to the AV with the results.

In some embodiments, the AV computing system 300 of a given AV may include a primary advanced autonomy system 304 and a redundant basic automation system 306 that are each configured to collect information about a total measurable world 302 around the given AV and determine how the given AV should operate. In some embodiments, the primary advanced autonomy system 304 may be configured to capture sensor data relating to the given AV, the total measurable world 302 surrounding the given AV, and/or objects included in the total measurable world 302 and make one or more decisions for controlling operations of the given AV based on the captured sensor data. The primary advanced autonomy system 304 may include one or more sensor groups 308 in which one or more sensors included in the one or more sensor groups 308 are configured to collect the information about the total measurable world 302, and sensor drivers 310, a calibration system 312, and/or a synchronization system 314 may be configured to process sensor data collected by the sensor groups 308 and send the information to one or more computing subsystems of the given AV. In some embodiments, the sensor drivers 310 may facilitate connecting between the sensor groups 308, the calibration system 312, and the synchronization system 314 such that information collected by the sensor groups 308 may be obtained by other computing subsystems of the primary advanced autonomy system 304.

The computing subsystems may include, for example, a human-machine interface (HMI) system 316, a security system 318, a perception system 320, the localization system 322, the high-definition mapping system 324, a fusion system 326, a routing system 328, a visualization system 330, the semantic map service 332, the semantic map creation system 334, the prediction system 336, the decision-making system 338, the diagnostic system 340, a planning system 342, an adaptive control system 344, a cloud agent 346, a drive-by-wire (DBW) abstraction system 348, a real vehicle DBW system 350, any other computing subsystems that may be configured to facilitate operation of the given AV, or some combination thereof. Additionally or alternatively, the AV computing system 300 may include the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and/or the mobile app 128 as described in relation to the autonomous driving system 100 of FIG. 1. In some embodiments, the HMI system 316 may include a user interface that allows a human user to input information that may influence driving operations of the AV. The security system 318 may prevent user input via the HMI system 316 from affecting computations and/or driving operations of the AV. The perception system 320 may be configured to detect and identify objects based on the sensor data, and the localization system 322 may determine a location and/or a position of the AV relative to the identified objects in a given environment. The high-definition mapping system 324 may populate a map that provides additional context about the given environment in which the AV operates and may maintain a map such that if the AV traverses an area where it has previously traveled the AV can rely at least in part on the previously generated map. The fusion system 326 may combine sensor data collected by different sensor groups 308 such that the sensor data may be analyzed from a common perspective, time frame, and/or reference point. The routing system 328 may determine a route for the AV to reach an intended destination of the AV through the environment and/or the total measurable world 302. The visualization system 330 may display computational results and/or information relating to the driving operations of the AV in a way that users may understand. The semantic map service 332 and the semantic map creation system 334 may generate a semantic map that provides semantic meaning for one or more objects or elements of the total measurable world 302 in which the semantic meaning provides a traffic and/or driving context for the objects or elements of the total measurable world 302 (e.g., the application of traffic rules to a bike lane or a four-way stop, rather than merely categorization of objects as a roadway or a stop sign). The prediction system 336 may determine projected trajectories and/or paths of motion for the AV and/or objects in the vicinity of the AV. The decision-making system 338 may determine decisions for the driving operations of the AV based on the computational results from one or more computing subsystems. The diagnostic system 340 may receive input from other computing subsystems and analyze the computational results associated with the other computing subsystems to identify whether the computations of the other computing subsystems are being performed without error and/or within an accepted tolerance range. The planning system 342 may organize the decisions obtained from the decision-making system 340 so that the decisions may be sent to the adaptive control system 344 in a sequence that facilitates safe and efficient driving operations for the AV to reach the intended destination. The DBW abstraction system 348 may receive control information from the adaptive control system 344 and provide instructions to the real vehicle DBW system 350, which may actuate and affect driving operations of the AV, such as accelerating, braking, steering, or any other actions performable by the AV. In some embodiments, the AV computing system 300 may include the cloud agent 346, which may facilitate communication between the on-board computing system and the off-board cloud computing system.

In some embodiments, the AV computing system 300 may be configured to offload one or more of the computing subsystems, including the sensor drivers 310, the calibration system 312, the synchronization system 314, the HMI system 316, the security system 318, the perception system 320, the localization system 322, the high-definition mapping system 324, the fusion system 326, the routing system 328, the visualization system 330, the semantic map service 332, the semantic map creation system 334, the prediction system 336, the decision-making system 338, the diagnostic system 340, the planning system 342, the adaptive control system 344, and/or the cloud agent 346 to the off-board cloud computing system according to an adaptive computer architecture. Additionally or alternatively, the AV computing system 300 may or may not be configured to perform operations of the sensor groups 308, the DBW abstraction system 348, and/or the real vehicle DBW system 350 using the on-board computing system.

The redundant basic automation system 306 may include one or more basic safety redundant sensors 352 and a virtual bumper system 354 to facilitate basic automation of the given AV in situations in which the primary advanced autonomy system 304 is unresponsive, inaccurate, or otherwise fails to operate. In some embodiments, the redundant basic automation system 306 may be configured to control movement of the given AV and/or perform other operations associated with the given AV. The redundant basic automation system 306 may be included in the on-board computing system of the given AV, and the basic redundant sensors 352 may be configured to collect information about the total measurable world 302 in response to the given AV determining that the sensor groups 308 of the primary advanced autonomy system 304 are inoperable in some capacity. Additionally or alternatively, the basic redundant sensors 352 may always be in operation although the data sensed thereby may be discarded or stored without being used for computations or in determinations of how the AV should be operated in normal operation. In some embodiments, the virtual bumper system 354 may provide a virtual fence around the given AV that may be used to determine what basic operations the given AV should perform. For example, the given AV may be instructed to slow down and eventually stop moving altogether in response to any object entering the range of the virtual bumper system 354. The virtual bumper system 354 and/or any other basic safety redundant sensors may allow the given AV to continue to operate in situations in which communications with the off-board cloud computing system are hindered, the primary advanced automation system 304 is inoperable, and/or under any other adverse circumstances. Accordingly, the AV computing system 300 may or may not be configured to perform operations associated with the basic safety redundant sensors 352 and/or the virtual bumper system 354 using the on-board computing system without off-loading computation processing to the off-board cloud computing system.

The computing subsystems may include code and routines configured to enable a computing system, such as the AV computing system 300, to perform one or more operations. Additionally or alternatively, the computing subsystems may be implemented using hardware including a processor, a microprocessor (e.g., to perform or control performance of one or more operations), a field-programmable gate array (FPGA), or an application-specific integrated circuit (ASIC). In some other instances, the computing subsystems may be implemented using a combination of hardware and software. In the present disclosure, operations described as being performed by the computing subsystems may include operations that the computing subsystems may direct a corresponding system to perform. For example, the computing subsystems may be configured to perform a series of operations with respect to the sensor data obtained by the on-board computing system and/or the off-board cloud computing system.

In some embodiments, the primary advanced autonomy system 304 may include an adaptive architecture that facilitates operation of one or more of the computing modules at multiple frequencies of data capture, with multiple different data formats, etc. The adaptive architecture of the primary advanced autonomy subsystem may improve the computing and/or processing of information by the off-board cloud computing system. In these and other embodiments, one or more of the computing subsystems may include configuration units that align one or more properties of the inputs to a computing subsystem by adjusting computations and/or obtained information according to their associated data-capture frequencies, reformatting data, etc. For example, a given configuration unit may facilitate data capture and/or analysis by a computing subsystem included in the off-board cloud computing system at a variety of frequencies when the same computing subsystem included in the on-board computing system may capture and/or analyze data at a fixed frequency (e.g., the on-board computing system may determine a given characteristic at 10 Hz, while the off-board cloud computing system may determine the given characteristic at 100 Hz). As another example, configuration of one or more of the computing subsystems may facilitate adjusting horizon and/or event window sizes, increasing and/or decreasing the complexity of computational algorithms, increasing and/or decreasing a number of machine-learning stages (e.g., in a convolution neural network machine-learning model), increasing and/or decreasing a distance of route prediction, increasing and/or decreasing a number of points in a predicted route, or some combination thereof.

In some embodiments, all of the computing subsystems included in the primary advanced autonomy system 304 may be integrated into the on-board computing system. Additionally or alternatively, one or more of the computing subsystems may be off-loaded from the on-board computing system to the off-board cloud computing system as described above. In some embodiments, the computing subsystems may be off-loaded to the off-board cloud computing system such that computing subsystems that use relatively more computational resources to perform the operations of the computing subsystems (e.g., CPU processing resources, graphical processing resources, memory usage, hard disk storage space, other computation considerations, or some combination thereof) are performed at the off-board cloud computing system. Additionally or alternatively, the computing subsystems may be off-loaded to the off-board cloud computing system such that the computing subsystems that are sensitive to latency, perform operations localized to the AV, and/or based on any other efficiencies may be retained on the on-board computing system. For example, the sensor groups 308 configured to capture sensor data in the vicinity of the AV, the DBW abstraction system 348 configured to control local DBW operations of the AV, and/or the real vehicle DBW system 350 configured to actuate the DBW system of the AV may be included in the on-board computing system rather than in the off-board cloud computing system because the latency in transmitting sensor data to the off-board cloud computing system, the off-board cloud computing system performing computations on the sensor data, and sending back results may cause a lag for processes in which the sensor data is to be used imminently. As another example, the DBW abstraction system 348 and/or the real vehicle DBW system 350 may be configured to affect physical movement of the AV such that retaining the DBW abstraction system 348 and/or the real vehicle DBW system 350 with the on-board computing system reduces operational latency.

Modifications, additions, or omissions may be made to the AV computing system 300 without departing from the scope of the present disclosure. For example, the designations of different elements in the manner described is meant to help explain concepts described herein and is not limiting. For instance, in some embodiments, the primary advanced autonomy system 304, the redundant basic automation system 306, and/or any of the computing subsystems described in relation to the primary advanced autonomy system 304 and/or the redundant basic automation system 306 are delineated in the specific manner described to help with explaining concepts described herein but such delineation is not meant to be limiting. Further, the AV computing system 300 may include any number of other elements or may be implemented within other systems or contexts than those described.

Figure 4:
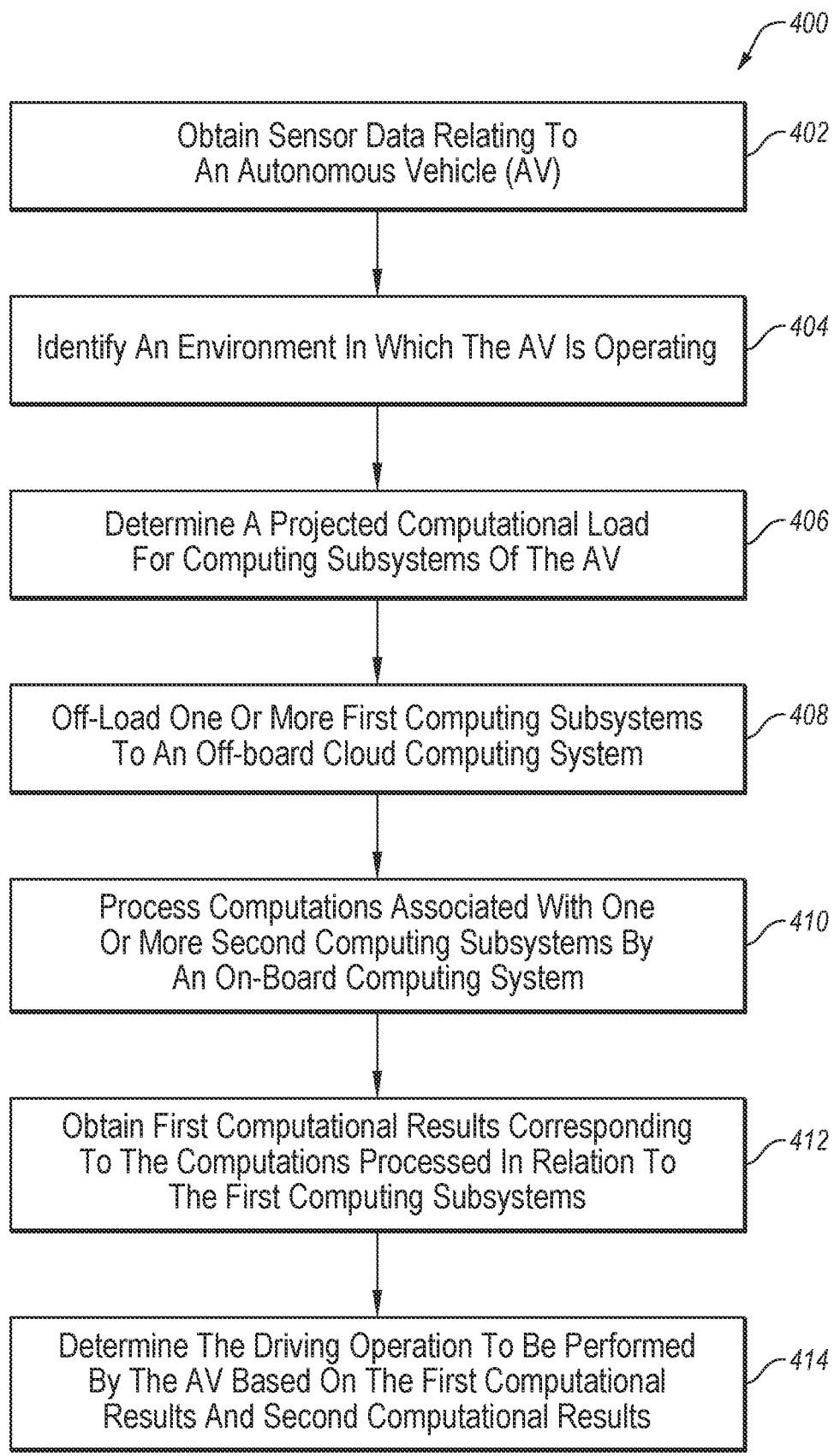
FIG. 4 is a flowchart of an example method of performing off-loading of one or more computing subsystems associated with a given AV according to an adaptive computation architecture as described in relation to one or more embodiments of the present disclosure.

FIG. 4 is a flowchart of an example method 400 of performing off-loading of one or more computing subsystems associated with a given AV according to an adaptive computation architecture as described in relation to one or more embodiments of the present disclosure. The method 400 may be performed by any suitable system, apparatus, or device. For example, the primary advanced autonomy system 304, the redundant basic automation system 306, and/or any of the computing subsystems described in relation to the primary advanced autonomy system 304 and/or the redundant basic automation system 306 of FIG. 3 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where sensor data relating to a given AV may be obtained. In some embodiments, the sensor data may describe a state of the given AV and/or a total measurable world around the given AV. The sensor data may be collected by one or more sensors positioned on, in, or in the vicinity of the given AV, such as the sensor groups 308 and/or the basic safety redundant sensors 352 as described in relation to the AV computing system 300 of FIG. 3.

At block 404, an environment in which the given AV is operating may be identified based on the sensor data. In some embodiments, the environment may describe a setting in which the given AV is situated so that expected traffic and object behaviors may be heuristically predicted. For example, a given setting may include a suburban neighborhood, a downtown road, a shopping center parking lot, a shopping mall parking structure, a school zone, a highway road, any other settings in which a vehicle may operate, or some combination thereof.

At block 406, a projected computational load for computing subsystems that are configured to facilitate a driving operation performable by the given AV may be determined in which the projected computational load corresponds to the identified environment. In some embodiments, the projected computational load may be determined as described in relation to method 500 of FIG. 5.

At block 408, one or more first computing subsystems of the computing subsystems may be off-loaded such that computations of the first computing subsystems are to be processed by an off-board cloud computing system. In some embodiments, the first computing subsystems may include the sensor drivers 310, the calibration system 312, the synchronization system 314, the HMI system 316, the security system 318, the perception system 320, the localization system 322, the high-definition mapping system 324, the fusion system 326, the routing system 328, the visualization system 330, the semantic map service 332, the semantic map creation system 334, the prediction system 336, the decision-making system 338, the diagnostic system 340, the planning system 342, the adaptive control system 344, and/or the cloud agent 346 as described in relation to the AV computing system 300 of FIG. 3.

At block 410, computations associated with one or more second computing subsystems may be processed by an on-board computing system. In some embodiments, the second computing subsystems may include the sensor groups 308, the DBW abstraction system 348, the real vehicle DBW system 350, the basic redundant safety sensors 352, and/or the virtual bumper system 354 as described in relation to the AV computing system 300 of FIG. 3.

At block 412, the projected computational load for the computing subsystems of the given AV may be re-determined. Re-determining the projected computational load may be performed using the same or a similar method as described in relation to method 500 of FIG. 5.

At block 414, whether the projected computational load exceeds a threshold level may be determined. In some embodiments, the threshold level may include a minimum threshold value such that responsive to determining that the projected computational load exceeds the minimum threshold value, the method 400 may proceed to block 416 because the projected computational load exceeds a computational load that the on-board computing system may process within an acceptable time for safe and/or effective driving operation of the AV. Responsive to determining that the projected computational load is less than the minimum threshold value, the method may proceed to block 418. Additionally or alternatively, the threshold level may include a maximum threshold value such that responsive to determining that the projected computational load exceeds the maximum threshold value, the method may proceed to block 416 because the projected computational load exceeds a computational load that the on-board computing system may process within an acceptable time for safe and/or effective driving operation of the AV. Responsive to determining that the projected computational load is less than the maximum threshold value, the method may proceed to block 418.

At block 416, the off-board cloud computing system may continue to process computations corresponding to the first computing subsystems. Because the projected computational load was determined to exceed the computational capacity of the on-board computing system at block 414, the off-board cloud computing system, which may have access to more computational resources or more robust computing processors, may continue to process computations corresponding to the first computing subsystems. After processing the computations corresponding to the first computing subsystems by the off-board cloud computing system, the method 400 may proceed to block 420. In some embodiments, additional computations may be offloaded to the off-board cloud computing systems based on the computational load exceeding the computational capacity of the on-board computing system.

At block 418, the on-board computing system may be designated to process the computations corresponding to the first computing subsystems. In some embodiments, the computations corresponding to the first computing subsystem may be processed in the same or a similar manner as the computations of the second computing subsystem being processed by the on-board computing system. In these and other embodiments, one or more of the computing tasks offloaded to the off-board computing system may be reclaimed by the on-board computing system such that the on-board computing system may perform additional computations.

In some embodiments, the blocks 412-418 may be performed mid-driving such that the computational load may be adaptively adjusted while the AV is in operation.

At block 420, first computational results corresponding to the computations processed in relation to the first computing subsystems may be obtained. The first computational results may involve one or more outputs of the first computing subsystems in response to receiving the sensor data and/or information from other computing subsystems as input.

At block 422, the driving operation to be performed by the given AV may be determined based on the first computational results and second computational results corresponding to computations processed in relation to the second computing subsystems. The second computational results may involve one or more outputs of the second computing subsystems in response to receiving the sensor data and/or information from other computing subsystems as input. The driving operation may include an action performable by the given AV, which may or may not be actuated by the real vehicle DBW system 350. For example, the driving operation may include the given AV braking, steering, accelerating, turning on a turn-signal indicator, or any other actions performable by a vehicle while driving.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
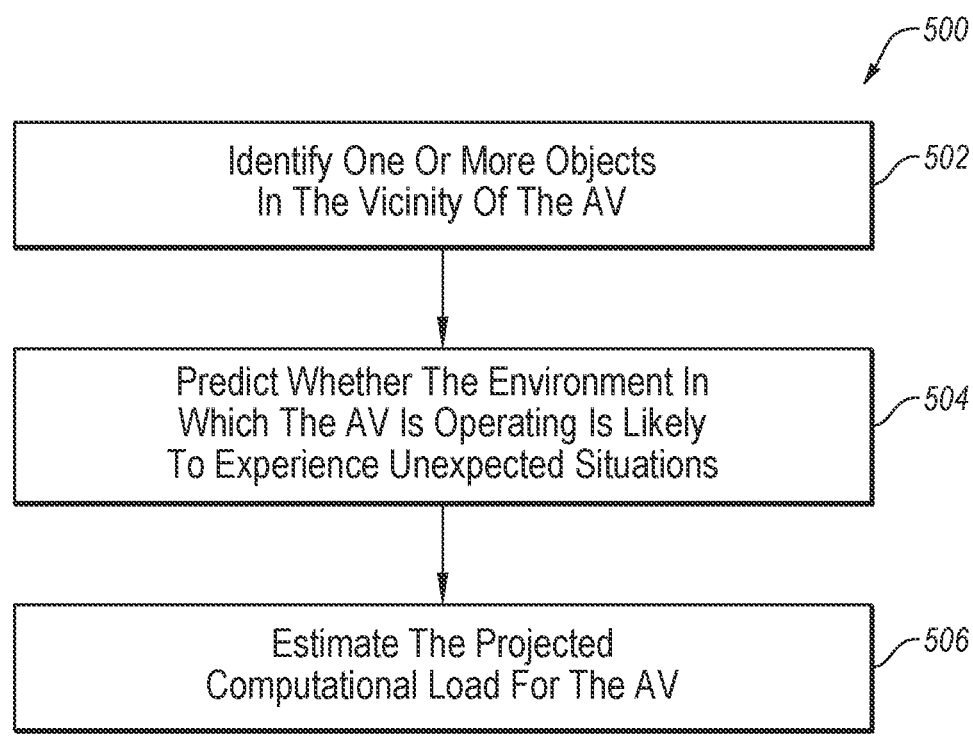
FIG. 5 is a flowchart of an example method of selecting one or more computing subsystems to be off-loaded to an off-board cloud computing system associated with a given AV according to an adaptive computation architecture as described in relation to one or more embodiments of the present disclosure.

FIG. 5 is a flowchart of an example method 500 of selecting one or more computing subsystems to be off-loaded to an off-board cloud computing system associated with a given AV according to an adaptive computation architecture as described in relation to one or more embodiments of the present disclosure. The method 500 may be performed by any suitable system, apparatus, or device. For example, the primary advanced autonomy system 304, the redundant basic automation system 306, and/or any of the computing subsystems described in relation to the primary advanced autonomy system 304 and/or the redundant basic automation system 306 of FIG. 3 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where one or more objects included in the vicinity of the given AV may be identified based on the obtained sensor data. In some embodiments, one or more computing subsystems of the given AV may analyze the objects in the vicinity of the given AV. Consequently, an environment that includes several objects may involve more computation processing than an environment that includes fewer objects.

At block 504, whether the environment in which the given AV is operating is likely to experience an unexpected situation that affects the driving operation of the given AV may be predicted. Some environments, such as an active school zone, may involve a higher likelihood of unexpected situations occurring, and as such, the computing subsystems of the given AV may process computations at a greater frequency so the given AV may quickly respond to any unexpected situations that do occur. By processing computations at a greater frequency, computational resource usage requirements for the computing subsystems may increase, which may or may not be sustainable or manageable by an on-board computing system of the given AV alone.

At block 506, the projected computational load for the given AV may be estimated based on the one or more objects and a likelihood of the given AV experiencing the unexpected situation. In some embodiments, modeling and predicting the behavior of objects and processing computations at a greater frequency may both be quantified in terms of computational resource usage and/or computational processing speed, so the projected computational load for the given AV may be estimated in terms of the computational resource usage and/or the computational processing speed. Responsive to determining that the projected computational load exceeds one or more threshold values of computational resource usage and/or computational processing speed, one or more of the computing subsystems operating in relation to the given AV may be off-loaded such that computations associated with the off-loaded computing subsystems may be processed using an off-board cloud computing system.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
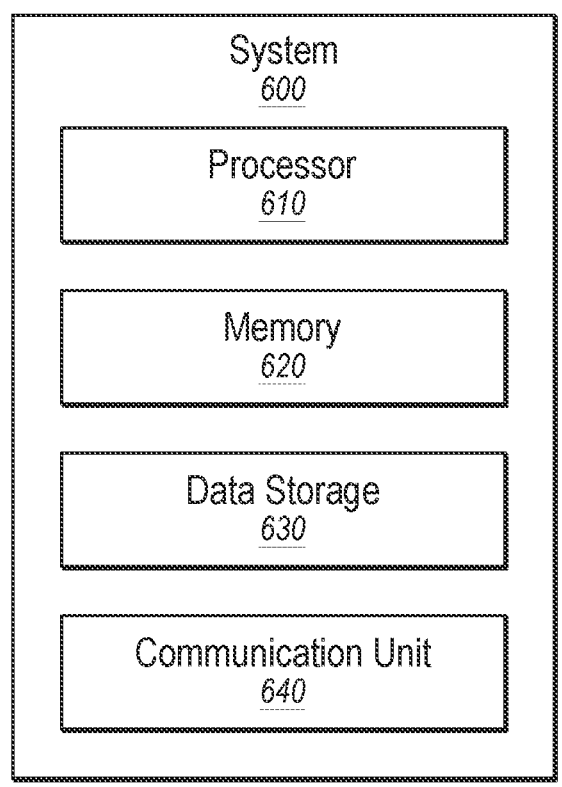
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the AV computing system 300 of FIG. 3 may be implemented as a computing system consistent with the computing system 600, including the primary advanced autonomy system 304, the redundant basic automation system 306, and/or any of the computing subsystems described in relation to the primary advanced autonomy system 304 and/or the redundant basic automation system 306.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform operations associated with the primary advanced autonomy system 304 and/or the redundant basic automation system 306.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may store the sensor data, the computational results, and/or any other pieces of information obtained by and/or outputted by the on-board computing system and/or the off-board cloud computing system. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   obtaining sensor data relating to an autonomous vehicle (AV) and a total measurable world around the AV;

identifying an environment in which the AV is operating based on the obtained sensor data;

determining a projected computational load for computing subsystems of the AV corresponding to the identified environment, the computing subsystems being configured to facilitate a driving operation performable by the AV and the projected computational load including an estimated total amount of computational resources utilized to determine the driving operation performable by the AV in the identified environment using computations performable by the computing subsystems;

off-loading one or more first computing subsystems of the computing subsystems in which first computations of the one or more first computing subsystems are to be processed by an off-board cloud computing system;

processing second computations associated with one or more second computing subsystems of the computing subsystems by an on-board computing system;

obtaining first computational results corresponding to the first computations processed in relation to the first computing subsystems; and determining the driving operation to be performed by the AV based on the first computational results and second computational results corresponding to the second computations processed in relation to the second computing subsystems.

2. The method of claim 1, wherein determining the projected computational load for the computing subsystems of the AV includes:

identifying one or more objects proximate to the AV based on the obtained sensor data;

predicting whether the environment in which the AV is operating is likely to experience an unexpected situation that relates to the driving operation of the AV; and estimating the projected computational load for the AV based on the one or more objects and a likelihood of the AV experiencing the unexpected situation.

3. The method of claim 1, wherein the first computing subsystems include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

4. The method of claim 1, wherein the second computing subsystems include at least one of: one or more sensor groups, a drive-by-wire abstraction system, a real vehicle drive-by-wire system, one or more basic safety redundant sensors, and a virtual bumper system.

5. The method of claim 1, wherein a number of the first computing subsystems off-loaded to be processed by the off-board cloud computing system increases as the estimated computational resource usage of the identified environment increases.

6. The method of claim 1, further comprising:

determining an updated projected computational load for computing subsystems of the AV;

based on the updated projected computational load, performing one of:

offloading an additional computing subsystem to be processed by the off-board computing system; or reclaiming one or more of the first computations associated with at least one of the first computing subsystems to be performed by the on-board computing system.

7. One or more non-transitory computer-readable storage media configured to store instructions that, in response to being executed, cause a system to perform operations, the operations comprising:

obtaining sensor data relating to an autonomous vehicle (AV) and a total measurable world around the AV;

identifying an environment in which the AV is operating based on the obtained sensor data;

determining a projected computational load for computing subsystems of the AV corresponding to the identified environment, the computing subsystems being configured to facilitate a driving operation performable by the AV and the projected computational load including an estimated total amount of computational resources utilized to determine the driving operation performable by the AV in the identified environment using computations performable by the computing subsystems;

off-loading one or more first computing subsystems of the computing subsystems in which computations of the one or more first computing subsystems are to be processed by an off-board cloud computing system;

processing second computations associated with one or more second computing subsystems of the computing subsystems by an on-board computing system;

obtaining first computational results corresponding to the first computations processed in relation to the first computing subsystems; and determining the driving operation to be performed by the AV based on the first computational results and second computational results corresponding to the second computations processed in relation to the second computing subsystems.

8. The one or more non-transitory computer-readable storage media of claim 7, wherein determining the projected computational load for the computing subsystems of the AV includes:

identifying one or more objects proximate to the AV based on the obtained sensor data;

predicting whether the environment in which the AV is operating is likely to experience an unexpected situation that relates to the driving operation of the AV; and estimating the projected computational load for the AV based on the one or more objects and a likelihood of the AV experiencing the unexpected situation.

9. The one or more non-transitory computer-readable storage media of claim 7, wherein the first computing subsystems include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

10. The one or more non-transitory computer-readable storage media of claim 7, wherein the second computing subsystems include at least one of: one or more sensor groups, a drive-by-wire abstraction system, a real vehicle drive-by-wire system, one or more basic safety redundant sensors, and a virtual bumper system.

11. The one or more non-transitory computer-readable storage media of claim 7, wherein a number of the first computing subsystems off-loaded to be processed by the off-board cloud computing system increases as the estimated computational resource usage of the identified environment increases.

12. The one or more non-transitory computer-readable storage media of claim 7, wherein the operations further comprise:
determining an updated projected computational load for computing subsystems of the AV;
based on the updated projected computational load, performing one of:
offloading an additional computing subsystem to be processed by the off-board computing system; or
reclaiming one or more of the first computations associated with at least one of the first computing subsystems to be performed by the on-board computing system.

13. A system, comprising:
a first computing system located remotely relative to an autonomous vehicle (AV), the first computing system including one or more computing subsystems configured to analyze sensor data collected by one or more sensor groups of a second computing system, wherein the first computing system is communicatively coupled to the second computing system;
a second computing system on board the AV, the second computing system including:
the one or more sensor groups;
a drive-by-wire abstraction system; and
a real vehicle drive-by-wire system; and
one or more non-transitory computer-readable storage media configured to store instructions that, in response to being executed, cause the system to perform operations, the operations comprising:
obtaining sensor data relating to the AV and a total measurable world around the AV;
identifying an environment in which the AV is operating based on the obtained sensor data;
determining a projected computational load for computing subsystems of the AV corresponding to the identified environment, the computing subsystems being configured to facilitate a driving operation performable by the AV and the projected computational load including an estimated total amount of computational resources utilized to determine the driving operation performable by the AV in the identified environment using computations performable by the computing subsystems;
off-loading one or more first computing subsystems of the computing subsystems in which computations of the one or more first computing subsystems are to be processed by the first computing system;
processing second computations associated with one or more second computing subsystems of the computing subsystems by an on-board computing system;
obtaining first computational results corresponding to the first computations processed in relation to the first computing subsystems; and
determining the driving operation to be performed by the AV based on the first computational results and second computational results corresponding to the second computations processed in relation to the second computing subsystems.

14. The system of claim 13, wherein determining the projected computational load for the computing subsystems of the AV includes:
identifying one or more objects proximate to the AV based on the obtained sensor data;
predicting whether the environment in which the AV is operating is likely to experience an unexpected situation that relates to the driving operation of the AV; and
estimating the projected computational load for the AV based on the one or more objects and a likelihood of the AV experiencing the unexpected situation.

15. The system of claim 13, wherein the first computing subsystems include at least one of: one or more sensor drivers, a calibration system, a synchronization system, an HMI system, a security system, a perception system, a localization system, a high-definition mapping system, a fusion system, a routing system, a visualization system, a semantic map service, a semantic map creation system, a prediction system, a decision-making system, a diagnostic system, a planning system, an adaptive control system, and a cloud agent.

16. The system of claim 13, wherein a number of the first computing subsystems off-loaded to be processed by the first computing system increases as the estimated computational resource usage of the identified environment increases.

17. The system of claim 13, further comprising a third computing system that includes one or more basic safety redundant sensors and a virtual bumper system.

* * * * *